(12) United States Patent
Curry

(10) Patent No.: US 9,576,447 B1
(45) Date of Patent: Feb. 21, 2017

(54) COMMUNICATING INFORMATION TO A USER

(71) Applicant: Sarah Katherine Curry, Somerville, MA (US)

(72) Inventor: Sarah Katherine Curry, Somerville, MA (US)

( * ) Notice: Subject to any disclaimer, the term of this patent is extended or adjusted under 35 U.S.C. 154(b) by 0 days.

(21) Appl. No.: 14/469,665

(22) Filed: Aug. 27, 2014

(51) Int. Cl.
*H04B 3/36* (2006.01)
*G08B 6/00* (2006.01)

(52) U.S. Cl.
CPC ..................... *G08B 6/00* (2013.01)

(58) Field of Classification Search
CPC .................. G08B 6/00; G08B 21/02
USPC .............. 340/407.1, 573.4, 539.13
See application file for complete search history.

(56) References Cited

U.S. PATENT DOCUMENTS

| | | | |
|---|---|---|---|
| 8,253,589 B2 * | 8/2012 | Grimm et al. | G01S 5/0072 340/539.13 |
| 2005/0073438 A1 * | 4/2005 | Rodgers et al. | G08G 1/161 340/944 |
| 2012/0218090 A1 * | 8/2012 | Rothschild | G08B 6/00 340/407.1 |
| 2012/0299713 A1 * | 11/2012 | Elia et al. | B60W 30/0956 340/435 |
| 2013/0194093 A1 * | 8/2013 | Rakijas | G08B 27/006 340/539.13 |

* cited by examiner

*Primary Examiner* — Thomas Mullen
(74) *Attorney, Agent, or Firm* — Albert J. Brunett

(57) ABSTRACT

A method and device for providing information to a user are provided. The method includes providing at least one user indicator device in operable communication with the user for providing non-visual and non-verbal communications to the user, and enabling information to be received by the user indicator device from a remote source. The method further includes communicating information to the user via the user indicator device in a non-visual and non-verbal way that may be substantially indicative of at least one instruction for the user so the user can operate in one or more environments in conformance with the information provided.

4 Claims, 3 Drawing Sheets

COMMUNICATING INFORMATION TO A USER

BACKGROUND OF THE INVENTION

Field of the Invention

The present invention generally relates to communication methods and devices and, more particularly, to incorporating non-visual and non-verbal communications in such methods and devices.

Background Information

There are several existing communication methods and devices that may be used to provide information to a user. Often times, however, these methods and devices communicate information in the form of visual commands and/or verbal commands which may be difficult to see or understand and may prevent the user from paying attention to their surrounding environment.

SUMMARY OF THE INVENTION

A method and device for providing information to a user are provided. The method includes providing at least one user indicator device in operable communication with the user for providing non-visual and non-verbal communications to the user, and enabling information to be received by the user indicator device from a remote source. The method further includes communicating information to the user via the user indicator device in a non-visual and non-verbal way that may be substantially indicative of at least one instruction for the user so the user can operate in one or more environments in conformance with the information provided.

DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DESCRIPTION OF THE PREFERRED EMBODIMENTS

Figure 1:
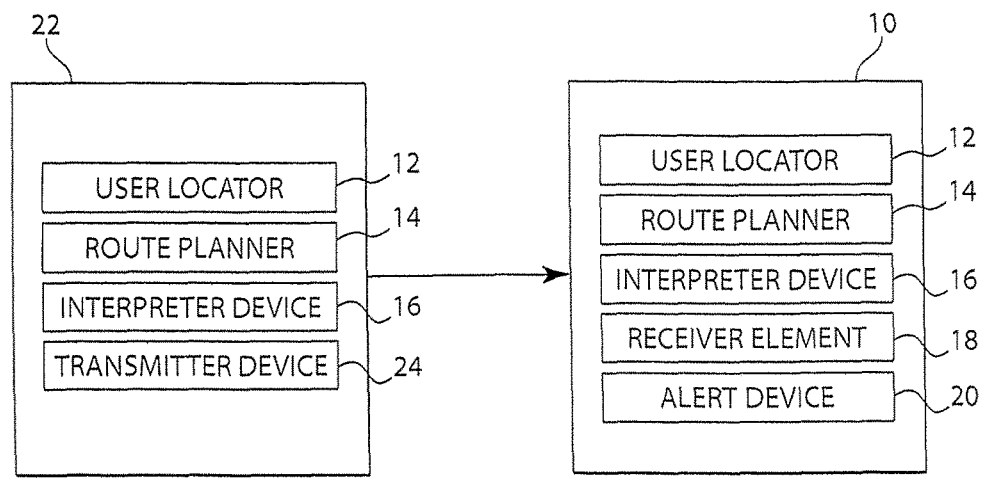
FIG. 1 generally illustrates a block diagram of the device in accordance with one embodiment of the invention.
Figure 1A:
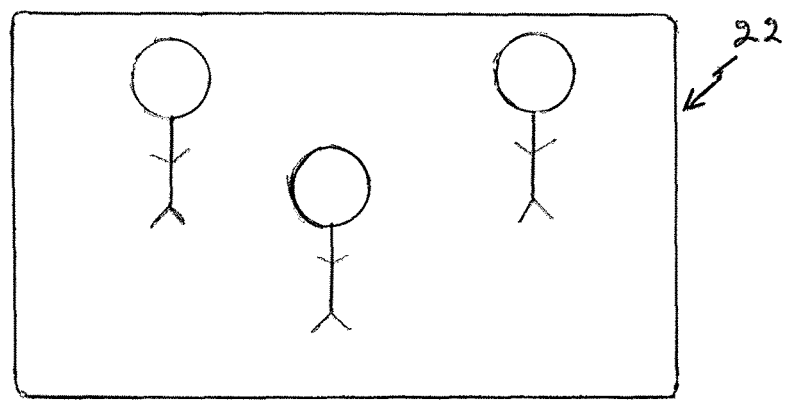
FIG. 1a illustrates an embodiment of the mobile device of the present invention.

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

Certain terminology is used herein for convenience only and is not to be taken as a limitation on the present disclosure. In the drawings, the same reference letters are employed for designating the same elements throughout the figures.

The present invention is generally related to providing information to a user through non-visual and non-verbal communications. In the context of the invention, this may refer to audible tones or any type of haptic-based communication that is based on the user's sense of touch and can be physically felt by a user. For example, a user may wear a device (or more than one device) that is capable of providing a vibrating/buzzing effect that may represent certain information and/or instructions for the user.

Providing information to a user through non-visual and non-verbal communications (alerts) may be advantageous in a variety of applications. With these types of communications, a user is able to pay maximum attention to their surrounding environment without being distracted by visual-based commands such as those provided on a display screen and/or verbal-based commands such as those expressed in words.

In war zones, for example, soldiers may need to continuously pay attention to their surrounding environment and may need to remain silent so that they are not detected. When executing a mission or otherwise moving throughout the war zone, soldiers may need to receive information such as navigation instructions (e.g., which route to take to get to a destination) as well as various commands from their officers. By receiving non-visual and non-verbal alerts, soldiers may receive meaningful information while still being able to pay attention to their surrounding environment.

Other military and law enforcement officials may similarly benefit from the features of the invention. Communicating visual or verbal orders to these officials may be impractical in dark environments or loud environments (such as in riots, shooting ranges, and areas with active weaponry). The features of the invention therefore allow users to give/receive orders in environments in which verbal or visual commands may be impractical.

The present invention may also be beneficial for automobile drivers, both commercial and non-commercial. The features of the invention may allow a driver to receive information such as navigation instructions in a non-distracting way so that the driver may continue to pay attention to their environment as they are driving.

Employees such as those in warehouse facilities may also benefit from the features of the invention. Forklift operators, for example, may often need to travel through large areas for various purposes. The features of the invention may provide these operators with information or instructions in a non-distracting way so they're able to pay attention to their surrounding environment.

Similarly, the features of the invention may be used to provide information such as navigation instructions for other motorists, bicyclists, runners, joggers, walkers, or anyone else moving through an environment. The above list is merely exemplary and applicant contemplates that the features of the invention may be used in a wide variety of applications.

The non-visual and non-verbal communications, such as haptic-based alerts, may be communicated to users through user indicator devices worn by users. For example, a user may wear wristbands, armbands, legbands, headphones (ear pieces), adhesive patches placed on their body, or any other type of device as long as it can provide the desired alert.

These types of wearable devices may be relatively non-invasive, lightweight, and easy to wear and remove, if desired. This may be desirable for soldiers, for example, who may already be carrying a significant amount of weight and need to maintain a high degree of maneuverability.

FIG. 1 generally illustrates a user indicator device 10 in accordance with one embodiment of the invention, in which the device 10 may be used to provide navigation instructions to a user. The device 10 may include a user locator 12, a route planner 14, an interpreter device 16, a receiver element 18, and an alert device 20. The user indicator device 10 may also be in operable communication with a mobile device 22 (such as a user's "smartphone") that may include similar components, as well as a transmitter device 24.

As can be seen in FIG. 1, the user indicator device 10 may include all the necessary components to gather information regarding the user's location and to provide the desired communications. However, certain components (e.g., a user locator 12, route planner 14, and interpreter device 16) may additionally or alternatively be configured with a mobile device 22 that is separate from the user indicator device 10. In this scenario, the relevant navigation information may be transmitted to the user indicator device 10.

Briefly, in operation a user may move within their environment to reach their destination. The user locator 12 may monitor the user's location and their progress in following a route generated by the route planner 14.

As the user is moving through the environment, the user indicator device 10 (or the mobile device 22) may recognize if and when the user should make a certain navigation step (e.g., turn onto an upcoming street). This information may then be communicated to the interpreter device 16.

The interpreter device 16 may receive and interpret the information into actionable command signals for the alert device 20 to produce a particular non-verbal and non-visual alert. The user may understand this alert to represent a certain navigation instruction, and then navigate or otherwise operate within their environment accordingly.

As stated previously, the user indicator device 10 in accordance with the invention may be used in a variety of applications to provide information to a user. The application and configuration of the device 10 may also vary as long as the features of the invention may be accomplished.

The user indicator device 10 (or mobile device 22, if applicable) may be configured with a user locator 12 such as GPS technology. A user may input their destination via an interface, not shown, in which case the route planner 14 may generate a route to the destination.

The features of the invention may also take advantage of other user-locating devices, such as RFID tag reader systems. For example, in the warehouse environment mentioned previously, a user's location may be monitored using an RFID tag and reader system with RFID tag readers placed at specific, known, positions within the warehouse, such that the tags placed on the user are recognized by the tag readers.

It is contemplated that other types of camera devices and computer vision analysis tools may be used to monitor the users' locations in an environment. The exact configuration or process for monitoring user locations, whether available now or invented hereafter, may vary as long as the features of the invention can be accomplished.

The interpreter device 16 may interpret information from the user locator 12 and route planner 14 into commands for non-visual and non-verbal alerts. The configuration of the interpreter device 16 may vary so long as it can execute the software and novel algorithms necessary to interpret the navigation information into appropriate commands.

The location of the interpreter device 16 may vary as well. FIG. 1 generally illustrates that the interpreter device 16 can be part of the user indicator device 10. The interpreter device 16 may also be configured to interpret information at a remote location, for example.

Alternatively, an interpreter device 16 may be integrally configured as part of the mobile device 22. The location of where information regarding the user's location is interpreted may of course vary as long as the desired alerts can be produced.

Communication between the components of the user indicator device 10, as well as the mobile device 22 (if applicable), may be made by any suitable wireless connectivity. For example, the receiver element 18 may be a Bluetooth receiver.

The receiver element 18 may receive the signal from the interpreter device 16 or may receive signals directly from the transmitter device 24. In the latter case, the information may be passed along to the interpreter device 16 before it is passed on to the alert device 20.

The user indicator device 10 may be any type of device that can be in operable communication with the user so that the user can receive and understand the non-visual and non-verbal alerts. As stated previously, the user indicator device 10 may be a wearable device appropriately positioned on the user's body.

For example, the user indicator device 10 may be a wristband device that a user wears on their wrist and the alert device 20 may be a vibration mechanism. In this embodiment, certain vibration patterns may represent certain navigation instructions. For example, a single, "long" vibration may instruct the user to make a left-hand turn at an upcoming intersection, while a series of "short" vibration patterns may instruct the user to make a right-hand turn at an upcoming intersection.

Similarly, the alert device 20 may be configured to provide more frequent alerts as a user is getting closer to a location in which they're supposed to make a turn, for example. Or, the alert device 20 may communicate alerts in Morse code or some other type of code or the like.

Additionally, more than one user indicator device 10 could be used (e.g., a wristband for the user's left wrist and a wristband for the user's right wrist, each including an alert device 20). In this embodiment, a vibration of the left wristband may instruct the user to make a left-hand turn at an upcoming intersection, while a vibration of the right wristband may instruct the user to make a right-hand turn at an upcoming intersection.

Figure 2:
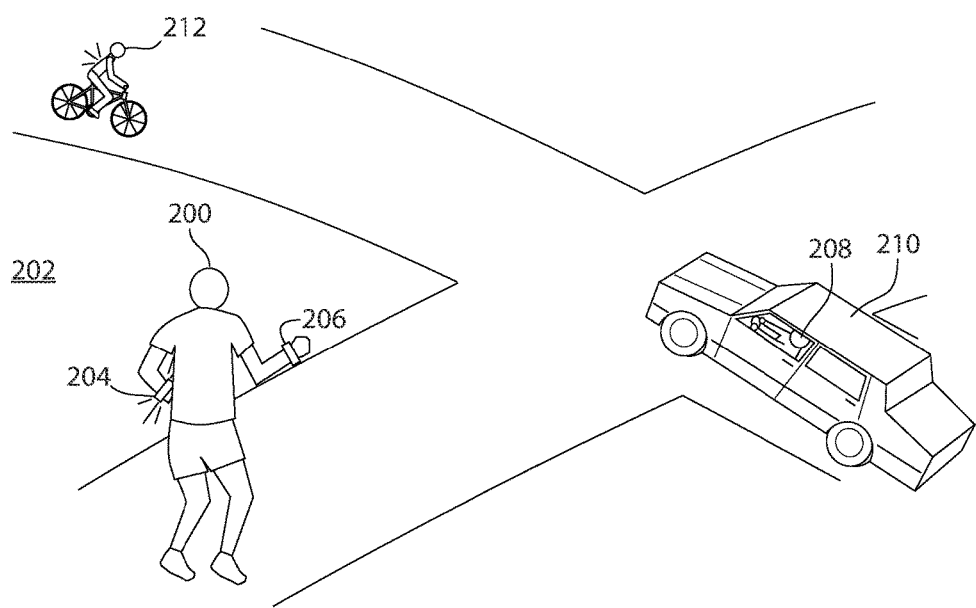
FIG. 2 generally illustrates users traveling within an area in accordance with one embodiment of the invention.

FIG. 2 generally illustrates a user 200 running in an area 202. As can generally be seen, the user 200 is wearing user indicator devices in the form of a left wristband 204 and a right wristband 206.

As the user 200 is approaching an intersection such as the one illustrated in FIG. 2, the left wristband 204 is generally seen as providing a vibration. This vibration may, as understood by the user 200, be instructing the user 200 to turn left at the intersection.

The user indicator device 10 may be configured to provide navigation instructions at a predetermined distance from an intersection, for example. Or, multiple instructions may be provided at substantially the same time. For example, in the configuration generally illustrated in FIG. 2, the left wristband 204 may provide an alert, then the right wristband 206 may provide an alert, thereby instructing the user to make a left turn and then a right turn.

By providing these types of alerts, the user 200 is able to pay maximum attention to their surrounding area 202. This is of course desirable in loud and crowded environments, especially those with other traveling entities.

For example, FIG. 2 also illustrates a driver 208 of a vehicle 210 and a bicyclist 212. These individuals may similarly be equipped with user indicator devices to receive similar alerts for navigation instructions while still being able to pay attention to their surrounding environment.

The user indicator device 10 may also be configured with a user's headphones or ear pieces or may be integrated into clothing, a hat, or a helmet a user may be wearing or any other configuration. In this embodiment, the headphones or the like may vibrate or even provide brief audible tones understood and only heard by the user, as opposed to lengthy and often confusing verbal instructions such as those expressed in words. A user may understand audible tones, such as those from a left ear piece or right ear piece or different audible tones, as well as different beeping patterns to represent certain information or instructions.

The above embodiments of the user indicator device 10 are merely exemplary and applicant contemplates a wide variety of different types of devices that may be used to provide different types of non-visual and non-verbal alerts. The configurations may of course vary as long as the features of the invention can be accomplished.

Also, and in addition to vibrations, other types of haptic-based alerts or patterns may be used to provide information. For example, the alert device 20 may be configured to, in combination with the user indicator device 10, change temperature, shape, or size (e.g., inflate/deflate), or undertake any other type of action that can be physically felt by the user and understood by the user to represent an instruction.

Referring back to FIG. 1, the mobile device 22 may also gather and provide information regarding the user's location and destination. The mobile device 22 may be a user's smartphone, for example, that is configured with a user locator 12 such as GPS technology. In this scenario, a user may input their destination into the mobile device 22 and the route planner 14 may generate a route.

In this embodiment, the user may carry their mobile device 22 (e.g., in their pocket) as they are out running, driving, cycling, or otherwise navigating through their environment. When appropriate, the mobile device 22 may transmit the relevant navigation information to the user indicator device 10.

Figure 3:
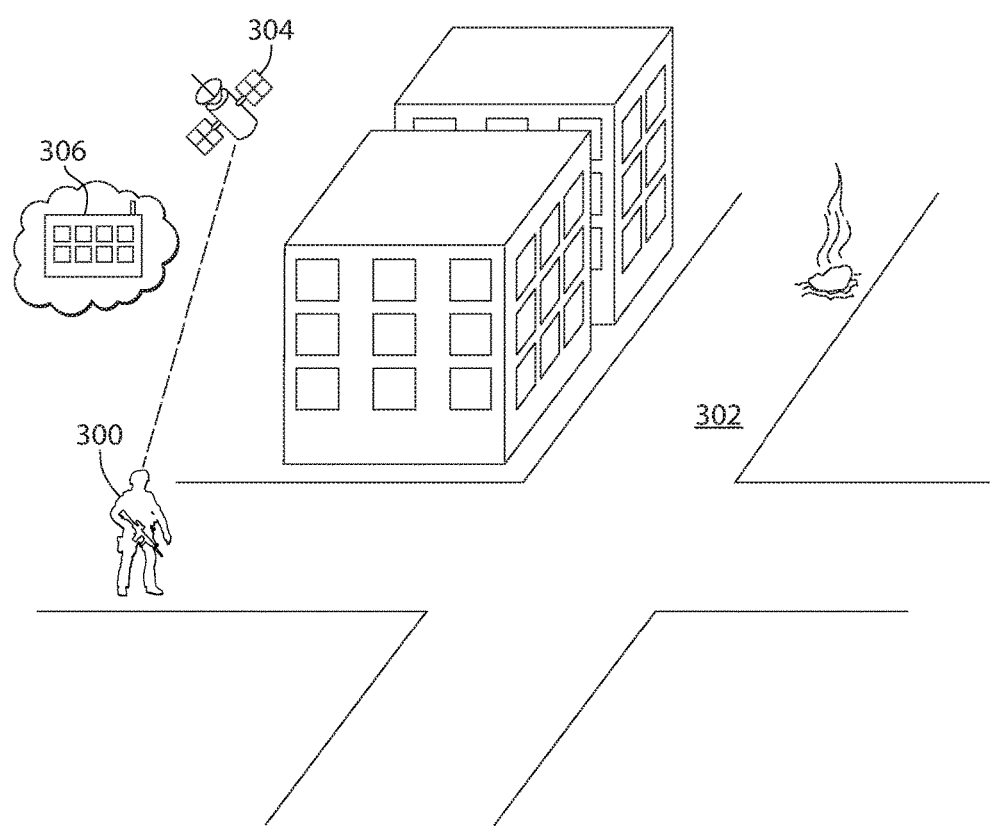
FIG. 3 generally illustrates a soldier moving through an area in accordance with one embodiment of the invention.

FIG. 3 generally illustrates another application of the invention, in which a soldier, policeman or the like 300 is moving through a war zone 302 or other environment. As stated previously, the ability for a soldier 300 to pay attention to their surroundings and to navigate stealthily in this type of environment is critical to mission success and safety. The soldier 300 may similarly be equipped with the previously-discussed components such as the receiver element and the alert device to receive information and non-visual and non-verbal alerts.

It is also contemplated that a user, such as the soldier 300, can receive these types of alerts through a satellite connection 304 from a remote location 306. An operator at the remote location 306 may be monitoring the position of the soldier 300, for example, by a drone or the device 10 or any other device and may communicate certain instructions in the form of non-visual and non-verbal alerts that are understood by the soldier 300.

In addition to navigation instructions, other types of instructions or information may be provided to the soldier 300 (or to a user in general). Instructions may relate to specific tasks in a war zone such as setting up a perimeter, remaining at a specific location, advance, retreat, react to threats, divert a line of fire or any other type of instruction.

FIG. 3 merely illustrates one application of the present invention. Other military personnel, law enforcement officials, and other users may similarly use the features of the invention to provide/receive information in non-visual and non-verbal ways.

Although the description above contains many specific examples, these should not be construed as limiting the scope of the embodiments of the present disclosure but as merely providing illustrations of some of the preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

I claim:

1. A system for providing real time, dynamic, continuous, non-visual and non-verbal navigation instructions that at least periodically direct a user to move in particular directions within an environment as the user moves along a route within the environment, comprising:

first and second user indicator devices, each device at least including hardware and software for receiving and converting externally generated signals into a variety of haptic signals recognizable by the user, the first and second indicator devices being designed for removable positioning on right and left appendages of a user respectively, the haptic signals varying with respect to at least one of duration, frequency, position on the user and type where the duration, frequency, position on the user and type of the haptic signals provide the user with instructions to move in one or more directions as the user moves along a route within the environment; and a mobile device for use in relatively close proximity to the first and second user indicator devices and capable of receiving both real time navigation information from a remote source as well as real time commands inputted from another person and communicating the information and commands to the user indicator devices in the form of signals so that the indicator devices can convert those signals into haptic signals recognizable by the user, the haptic signals continuously directing the user to move in a particular direction as the user moves along a route within the environment.

2. The system as defined in claim 1, including providing at least a first haptic signal directing the user to turn in a particular direction at a first point, the first haptic signal being provided when the user is at a first position substantially close to but slightly before the user reaches the first point and at least a second haptic signal directing the user to turn in the particular direction at the first point, the second haptic signal being provided as the user is at a second position even closer to the first point than the first position.

3. The system as defined in claim 1 wherein the real time commands inputted from another person to the mobile device at least include both a direction for the user to move as well as commands to take or not take a particular action.

4. The system as defined in claim 1 wherein at least 2 users are included and the mobile device includes a display screen and the positions of the users are visible on the screen within the environment so the other person providing commands knows where each user is positioned and can direct them together or individually to move in a direction within the environment.

* * * * *